Patented May 12, 1942

2,283,044

UNITED STATES PATENT OFFICE 2,283,044

STABILIZATION OF STARCHY PASTE

George V. Caesar, Staten Island, N. Y., assignor to Stein, Hall & Company, Inc., New York, N. Y., a corporation of New York No Drawing. Application September 8, 1939, Serial No. 293,921

3 Claims. (Cl. 106—213)

This invention relates to amylaceous compositions and more particularly to amylaceous compositions in aqueous form that are effectively modified in an improved manner to provide an adhesive, sizing, finishing and coating composition having desirable and stabilized viscosity characteristics.

Aqueous amylaceous compositions containing a relatively high concentration of amylaceous material are necessary for many uses. These high concentration compositions, however, have a pronounced tendency to thicken or jell at the lower temperatures at which the compositions are ordinarily used even though the compositions may have been rendered thin at elevated temperatures. This jelling action makes it difficult or impossible to employ the compositions for the intended purpose at ordinary temperatures.

It is an object of the invention, therefore, to provide an aqueous amylaceous composition which has the required high concentration of amylaceous solids and yet remains relatively non-viscous at ordinary temperatures as compared with the previously known compositions containing an equivalent high concentration of the amylaceous ingredient.

Another object of the invention is to provide an amylaceous composition which at ordinary temperatures retains a fluidity that is substantially stabilized and which is comparable to that which characterizes the composition at elevated temperatures.

These objects are accomplished by providing a process of treating amylaceous materials in water at an elevated temperature to form a so-called "thin boiling" mixture containing a relatively large proportion of amylaceous solids and at the same time inhibiting the normal re-association or jelling tendencies of the composition as it cools.

It is a further object of the invention to provide a composition of the character described which is economical to manufacture and which may be used in standard commercial practice in place of inferior compositions heretofore employed and without the necessity of additional equipment, ingredients or technical knowledge on the part of the user.

A further object of the invention is the provision of a composition in which raw starch can be employed as the amylaceous ingredient and which does not require any processing or other treatment prior to the time the starch is to be placed in solution at the time it is to be used.

The usefulness of an amylaceous composition as an adhesive, sizing, finishing or coating composition for textiles and paper depends to a large extent upon the viscosity characteristics of the solution under temperature conditions that are standard in plant practice. For example, the penetration of the composition, whether voluntarily brought about by capillary action or forced by pressure, is dependent to a great extent upon the low viscosity or free flowing properties of the composition. In addition, the amount of the amylaceous material that is retained by the textile or paper being treated depends to a large extent upon the concentration of the amylaceous material in the solution. In order that the proper amount of the amylaceous material may be applied properly or incorporated in the material being treated, it is essential that the solution should have a relatively high concentration of amylaceous material and yet should be sufficiently free flowing at the temperature and under the conditions of ordinary use to secure the necessary penetration or uniform distribution, or both. It is such a composition to which the invention relates.

In order to understand and appreciate more clearly the nature of the invention, and the manner in which it distinguishes from prior practices, it is desirable to consider some of the properties of amylaceous materials and solutions of the same under different conditions. While the present state of the art is such that an explanation of the viscosity characteristics of amylaceous solutions can not be set forth with certainty, theories have been proposed which appear to explain the observed facts. It may be said initially that the viscosity characteristics of amylaceous solutions are not explained solely on the basis of the specific gravity or dilution of the solution; rather they are explained on the basis of a changing characteristic in the amylaceous material itself under different conditions.

Raw amylaceous materials, such as starches and polar compounds of similar type, are believed to be composed of micelles or of oriented sheafs of glucose-anhydride chains associated through secondary valences of the coordinate type.

Upon the heating of an aqueous mixture of raw amylaceous material the granules thereof burst, and it is postulated that the individual sheafs or micelles become associated with water groups, likewise through secondary valence phenomena. At relatively high temperatures, the heat energy disperses the micelles, so that the viscosity is relatively low. With lower temperatures, the heat energy of the system is diminished and the micelles reassociate, through secondary valence forces, and the viscosity rises. Even at high temperatures, solutions of amylaceous material in the relatively high concentrations required for good results may be quite viscous and in a condition that is unsuitable for the uses referred to herein.

In order to reduce the viscosity at higher temperatures, it has been proposed heretofore to oxidize an aqueous starch paste by cooking processes. Such processes, it has been explained, tend to destroy the original micellar structure, but this also may increase the water binding power of the amylaceous material which, at lower temperatures may be reflected in an increased tendency to form an elastic gel by means of reassociation of the micelles. The disrupting of the micellar structure is known as disorganization, which may or may not be accompanied by appreciable degeneration of the primary valence chain of the starch molecule. The disorganization of starch by aqueous oxidation must be conducted on the alkaline side, if degeneration is to be inhibited.

Such a treatment by alkaline oxidation provides a so-called "cut" amylaceous material which may be quite fluid at elevated temperatures but which has a greater tendency to jell at lower temperatures. When these so-called thin boiling amylaceous materials are to be used, it is essential that they are to be kept at elevated temperatures. This is expensive and often inconvenient and under the best regulation coagulation often occurs which increases the difficulties.

It will be seen, therefore, that the viscous solutions of amylaceous material made merely by treating amylaceous material and water at elevated temperature may not be feasible for use at either high or low temperatures, and that the thin boiling amylaceous material prepared with an alkaline oxidizing medium, while available for use at high temperatures, may be too gelatinous or viscous at low temperatures, which prevents it from being used under these conditions.

Because the amylaceous compositions are more conveniently and practically utilized at lower temperatures, such as room temperature, it is to be seen that the rejelling conditions of solutions of amylaceous material constitute an inherent disadvantage which greatly increases operating costs and results in inferior products. While it is desirable to have the composition in a fluid state at room temperature, this characteristic must be obtained without an appreciable reduction of the proportion of the amylaceous material in the solution or the loss of any other desirable or essential property. It is, therefore, not possible simply to dilute the composition in an effort to obtain the required viscosity.

It has heretofore been proposed to obtain compositions of amylaceous material which are relatively fluid at ordinary temperatures, but such compositions are prepared by expensive means, require careful and elaborate technical control, and entail appreciable losses in the manufacturing operation.

In accordance with the invention, the amylaceous adhesive, coating, sizing and finishing composition may be produced inexpensively to provide a composition which is highly fluid at room temperature and yet contains a sufficiently high concentration of amylaceous material for the required use. The ingredients in my composition may be prepared in the dry state and when ready to be used need merely to be placed in solution at an elevated temperature. Upon cooling the composition remains comparatively thin and has stabilized viscosity characteristics.

In accordance with my invention, the aqueous amylaceous composition is formed in the usual manner by heating a suspension of amylaceous material in water, and including in the mixture, in order to provide the characteristics of thin boiling and a subsequent reduced viscosity increase at lowered temperatures, a small quantity of a long-chain compound, preferably sufficiently polar to be soluble. There is also included an oxidizing compound, preferably a per-oxygen compound and one that is alkaline in reaction.

The time at which the long-chain compound is added is not critical, it being necessary only that the addition be made prior to the cooling of the product. To insure that the desired characteristics will be present in the cooled product, it is preferred to make the additions at the time that the amylaceous material is suspended in water, but it is understood that my invention is not to be limited to this particular order of steps.

The simplest embodiment of my invention comprises a dry mixture of raw starch and the long-chain compound in the desired amount, with the oxidizing compound. In preparing this for use it is necessary only to place the dry mixture in suspension in water and then heat, whereupon the composition will have the desired properties heretofore described.

Any amylaceous material may be used as the base, such as tapioca flour, potato starch, rice flour, and other starch containing cereal flours, as well as starch derivatives such as dextrines and gums.

The long-chain compounds which may be employed in accordance with my invention may be illustrated by derivatives of the higher fatty acid esters or fatty alcohols, having hydrophillic properties, and having one or more polar groups, such as the sulfonates or sulfates. I use the term "sulfoxy" as generic to the sulfonate and sulfate groups. Such compounds are well known in the art and examples include the sulfonated and sulfated higher fatty alcohols, oils and fats of animal, vegetable or mineral origin, for example sulfonated castor oil and sulfated higher fatty alcohols and other sulfated compounds of the type known as wetting and detergent agents.

As illustrative of the addition agents described as per-oxygen compounds which are used in the present invention are the peroxides, perborates, chloramines, and hypochlorites. Specific examples of compounds which have been found to be preferable for the purposes of the present invention are sodium perborate, barium peroxide, chloramine T and calcium hypochlorite. In general, an alkaline compound such as an alkaline salt of the per type will be more effective but it will be obvious that such alkalinity may be imparted to the composition by small additions of alkali such as sodium carbonate and the like.

While the invention and the results obtained in accordance with the invention are not to be limited to any theory or explanation, it is interesting to observe that the novel results of the invention are explainable in connection with the theory of gel-formation described heretofore and accepted by authorities in this field. If, in accordance with such a theory, the primary cause of gel-formation is the reassociation of water with the starch micelles through secondary valences, the inhibition of such reassociation should reduce the changes in viscosity incident to cooling. I am of the opinion that the introduction of long-chain compounds containing one or more polar groups accomplishes this by coming in between the groups and micelles that tend to associate, thereby inhibiting the reassociation. The polar groups of the long-chain compounds in all probability are attracted to the polar groups of the starch micelles rendering the latter ineffective for association with water after a manner which may be inferred, speculatively, from present accepted theories of surface chemistry.

The quantity of the long-chain compound which is used will depend to a large extent upon requirements of use of the starch paste, and upon the size and character of the molecule of the long-chain compound. For example, a lesser amount of a dried sulfated fatty alcohol is required than of a sulfonated vegetable oil. In general, the amount of the long-chain compound is between about 1% and 5% based on the dry mixture, and a definite minimum amount is essential to secure the desired result. Larger amounts are uneconomical and may even promote a rethickening of another type. With lesser amounts, the paste stability is not obtained. I have found, for example, that from 3–4% of sulfonated vegetable oil, such as castor, yields maximum results, in paste stabilization and general utility of physical character of paste. One skilled in the art will be able to select suitable materials from the groups disclosed herein and to determine the most effective and economic proportion thereof by observing the characteristics of the composition obtained, and those desired. In order that my invention may be better understood, reference may be had to the following examples which are the most economical at this time and which are given merely by way of illustration and without any intention of limiting the scope of the invention to the proportions and materials given. In each case, the composition is thoroughly cooked at from 190° F. to the boiling point until thin and fluid. It is then cooled.

*Example I*

| | Parts |
|---|---|
| Tapioca flour | 247.5 |
| Sodium perborate (about 1%) | 2.5 |
| Sulfonated castor oil (about 1%) | 2.5 |
| Water | 1000 |

Upon cooling, the colloidal solution slowly thickens to a soft paste but does not become a stiff gel.

*Example II*

| | Parts |
|---|---|
| Tapioca flour | 247.5 |
| Sodium perborate (about 1%) | 2.5 |
| Sulfonated castor oil (about 3%) | 7.5 |
| Water | 1000 |

The paste thus derived is very fluid and stable at all temperatures from the boiling point down to room temperature, the same holding true for 4% of sulfonated oil. Somewhat above this approximately limiting proportion, a rethickening of the paste occurs, caused probably by a complex emulsion of oil in starch. It is found that the presence of a sulfonated castor oil in the general range of from 1% to 4% by weight of dry materials produces in an economical fashion a composition having desirable characteristics, and within this range 3% to 4% appears to be preferable for most uses.

*Example III*

| | Parts |
|---|---|
| Tapioca flour | 98 |
| Sodium perborate (about 1%) | 1 |
| Sulfated fatty alcohol (about 1%) | 1 |
| Water | 400 |

The cooled paste of the above composition resembles that of the paste set forth in Example II and remains fluid over the temperature range of from boiling to room temperature. While amounts of a sulfated alcohol higher than 1% may be used, such larger amounts appear unnecessary and uneconomical, but may be used within the general range noted. Amounts as low as ½% yield noticeable improvements.

In each of the examples given, the ratio of solids to water has been given as approximately one to four, and it is generally preferred to form the composition with as high a ratio of solid materials to water as is possible, without limiting the fluidity of the product. But it is to be understood that other concentrations may be used effectively in producing a desired fluid product. The following is illustrative:

*Example IV*

| | Parts |
|---|---|
| Tapioca flour | 97 to 99 |
| Sulfated fatty alcohol | 1 |
| or | |
| Sulfonated oil | 3 |
| Water | 900 |

The resulting material upon cooling has a relatively soft and moderate consistency.

The oxidizing agent has been specified in each of the examples as 1% of sodium perborate. This ingredient has been kept constant in order that the effect of varying the type and concentration of the fatty material would be more readily apparent. It will be obvious to those skilled in the art that the amount of oxidizing agent may be varied through a wide range, for example ¼ to 2%. Amounts of oxidizing agent greatly in excess of about 1% may involve secondary reactions of the starch with the reduced or decomposed oxidizing reagent, and be undesirable. Other reagents heretofore mentioned, such as the peroxides, may be substituted for perborate.

I have also found that the presence of certain long-chain substances having hydrophillic properties is effective in inhibiting or reducing what is known as "reversion" or "clouding" of the more or less soluble dextrine gums.

*Example V*

| | Parts |
|---|---|
| Tapioca dextrine | 100 |
| Sulfonated castor oil | 3 |
| Water | 67 |

The consistency or body of the cold gum is found to be greatly stabilized, and the tendency to revert or thicken is markedly reduced.

I am aware that it has been proposed to add relatively small amounts of wetting agents to starch mixtures for the purpose of modifying the surface tension of the mixture but such small amounts are not effective for the purpose of inhibiting thickening upon cooling. The amounts indicated as preferable in the prior art has not been such as would obtain my novel result. I am also aware that it has been proposed to add sulfated compounds to a modified starch with a large amount of caustic, but I am not aware that it has been proposed heretofore to use an oxidizing agent with long-chain compounds in an amount to inhibit a gelation upon cooling.

The word "solution" is used herein to include both true solutions and colloidal solutions, as well as highly dispersed suspensions which have many of the characteristics of solutions.

It will be apparent that my invention may be varied in a number of ways without departing from the spirit thereof, and all such variations are to be included as are within the scope of the following claims.

I claim:

1. A method of producing thin-boiling gelatinized starch relatively free-flowing at room temperature, which method comprises dispersing starch in water, in an amount of 10% to 25% of starch, at an elevated temperature to gelatinize the starch, and in the presence of a small proportion of an alkaline oxidizing agent to render the dispersion thin-boiling at elevated temperatures and gelable at room temperature; and adding to the dispersion at any stage of its manufacture prior to cooling a compound selected from the group consisting of sulfonated and sulfated long-chain aliphatic compounds in an amount sufficient to inhibit gelation of the dispersion when it cools to lower temperatures.

2. A method of producing thin-boiling gelatinized starch relatively free-flowing at room temperature, which method comprises dispersing starch in water, in an amount of 10% to 25% of starch, at an elevated temperature to gelatinize the starch, and in the presence of ¼% to 2% of an alkali metal per salt to render the dispersion thin-boiling at elevated temperatures and gelable at room temperature; and adding to the dispersion at any stage of its manufacture prior to cooling 1% to 4% of a sulfonated oil to inhibit gelation of the dispersion when it cools to room temperature.

3. A method of producing thin-boiling gelatinized starch relatively free-flowing at room temperature, which method comprises dispersing starch in water, in an amount of 10% to 25% of starch, at an elevated temperature to gelatinize the starch, and in the presence of ¼% to 2% of an alkali metal per salt to render the dispersion thin-boiling at elevated temperatures and gelable at room temperature; and adding to the dispersion at any stage of its manufacture prior to cooling ½% to 1% of a sulfated higher fatty alcohol to inhibit gelation of the dispersion when it cools to room temperature.

GEORGE V. CAESAR.

CERTIFICATE OF CORRECTION.

Patent No. 2,283,044.                                              May 12, 1942.

GEORGE V. CAESAR.

It is hereby certified that error appears in the printed specification of the above numbered patent requiring correction as follows: Page 4, second column, line 1, claim 1, for "lower temperatures." read --room temperature.--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.